(12) United States Patent
Giunta

(10) Patent No.: US 7,356,544 B2
(45) Date of Patent: Apr. 8, 2008

(54) METHOD AND SYSTEM FOR AUTOMATICALLY RELAYING WEBSITE INFORMATION

(76) Inventor: Giovanni Giunta, 58 Sophia Street, Roseville, Pretoria (ZA) 0084

( * ) Notice: Subject to any disclaimer, the term of this patent is extended or adjusted under 35 U.S.C. 154(b) by 495 days.

(21) Appl. No.: 10/879,970

(22) Filed: Jun. 29, 2004

(65) Prior Publication Data
US 2004/0267638 A1 Dec. 30, 2004

(30) Foreign Application Priority Data
Jun. 30, 2003 (ZA) .................................. 2003/5062

(51) Int. Cl.
*G06F 15/16* (2006.01)
(52) U.S. Cl. .................................. 707/103 X; 709/206
(58) Field of Classification Search ............ 707/103 X; 709/206
See application file for complete search history.

(56) References Cited

U.S. PATENT DOCUMENTS

2002/0188685 A1* 12/2002 Bhogal et al. ............... 709/206
2003/0040970 A1* 2/2003 Miller ........................... 705/26
2003/0084093 A1* 5/2003 Grason et al. ............... 709/203
2004/0122904 A1* 6/2004 Kim ............................ 709/206

FOREIGN PATENT DOCUMENTS

WO  WO 2065302 A1 * 8/2002

* cited by examiner

*Primary Examiner*—Chong H Kim
(74) *Attorney, Agent, or Firm*—Akerman Senterfitt

(57) ABSTRACT

This invention provides for a method 10 of automatically relaying website information by e-mail across an electronic network, which method 10 includes the steps of receiving 14 a conventional e-mail request from a requester which e-mail is addressed to a specific electronic mailbox address assigned to specific website information, and which e-mail includes an electronic return address to which the website information is to be relayed to. The method 10 then includes the step of retrieving 16 the website information from a web server which information is assigned to the specific mailbox address to which the received e-mail was addressed, and electronically mailing 18 the website information retrieved from the web server to the return address, so that the requester receives the website information without having to search the network. The Invention further provides for an associated system.

18 Claims, 9 Drawing Sheets

| Assigned Web Page Email Addresses |
|---|
| A3@audi.com |
|  |
|  |
|  |
|  |
|  |
| A4@audi.com |
| A6@audi.com |
| tt@audi.com |
| news@audi.com |
| dealers@audi.com |
| newyorkdealers@audi.com |

| Web page URL |
|---|
| www.audi.com/newvehicles/a3.html |
| www.audi.com/newvehicles/writeup/a3.html |
| www.audi.com/newvehicles/specifications/a3.html |
| www.audi.com/newvehicles/galleries/a3.html |
| www.audi.com/newvehicles/colours/a3.html |
| www.audi.com/newvehicles/3dview/a3.html |
| www.audi.com/newvehicles/a4.html |
| www.audi.com/newvehicles/a6.html |
| www.audi.com/newvehicles/tt.html |
| www.audi.com/news/recentnews.html |
| www.audi.com/dealernetworkusa/dealers.html |
| www.audi.com/dealersusa/eastcoast/newyork.html |

52 — Assigned Web Page Email Addresses
54 — Web page URL

METHOD AND SYSTEM FOR AUTOMATICALLY RELAYING WEBSITE INFORMATION

FIELD OF THE INVENTION

This invention relates to a method and associated system for automatically relaying website information across a network.

BACKGROUND TO THE INVENTION

The Internet consists of a network of millions of independent computers or servers that are connected throughout the world. These computers are linked to the Internet to allow access to information and other resources available on these computers or Internet servers, as they are known, via HTML (Hyper Text Markup Language) based Internet Browsers software similar to that of the popular Microsoft Internet Explorer and Netscape Navigator Internet browsers. Internet service providers or "ISP'S", such as companies like AOL provide the public and commercial entities access to these networks of computers by providing Internet access to this network through telephone lines and dial up access.

There are fundamentally two functions that the Internet offers once a person is connected thereto namely e-mail access and access to millions of Internet websites.

E-mail provides each user of the Internet a unique e-mail address, e.g. "john@yahoo.com", that allow these unique users who own e-mail addresses to communicate with each other by using e-mail software. The unique e-mail address is necessary to route e-mail to the correct requester through the Internet. Familiar e-mail applications are software like Microsoft Outlook Express for example, that is loaded onto the user's computer. There are also ways of accessing e-mail from the Internet, such as web page driven e-mail applications offered, for example, by "Yahoo" and "Hotmail". Typically these online e-mail applications are stored on a remote server and not on the user's computer. Users have access to these web based e-mail applications from any computer that has access to the Internet from any Internet browser software.

Accordingly, e-mail has become a powerful means of connecting one individual to another. Once you have the unique e-mail address of the individual you would like to communicate with, e-mail provides a fast and convenient method of communicating, distributing information, moving documents and files as attachments in an e-mail from one individual's e-mail address to another.

Web browsing is another intrinsic benefit of Internet access, which allows a user of the Internet to connect to Internet websites. Similar to e-mail, websites are also given unique identified descriptors know as a web address, e.g. "www.uspto.org", also known as a URL (uniform resource locator). These addresses allow users to access information specific to companies and organizations etc. To access these websites, users make use of web browser software similar to the popular Microsoft Internet Explorer or Netscape Browsers. Web browsers allow a user to type in the URL which identifies the owner and location of a website on a particular web server connected to the Internet, and allows the website information to be downloaded from the server and displayed in the web browser viewing window. To locate these websites, you need the exact website address. For example "www.uspto.org" is a specific URL location for the Unites States Patent Office website.

Once you enter the website, the first page (typically called the home page) affords a user the option of connecting to other resources or additional information within the website by clicking on buttons or hyperlinks that open new pages specific to the website or pages connected to other websites called web pages. A website can be described as a building with different floors and doors that lead to different groups of information. Each set of information is available in different web pages. For instance, when you visit a company's website like "www.ford.com", you are able to view the company's products and services that exist within the website by clicking on various buttons or links that open up new pages of information relating to that link or button. Web browsing or surfing is used to describe this process whereby you enter a specific websites home page through its web address e.g. "www.ford.com" and then continue to explore the channels of information available to you in the website. Taking the example of www.ford.com, the website may have links to different models of motor vehicles categorized by vehicle type. This listing allows you to seek information on specific products that are available in their own web pages within the "www.ford.com" website. In an online store like "amazon.com" for instance, you can enter the website and click on different product categories like DVD's and open up pages of information specific to the product category of choice, i.e. pages that contain only information on different makes and models of DVD players.

Each page within a website is given its own URL address to describe where this information is stored within the main website. While "www.ford.com" may take you to the companies homepage, a web page address with a specific URL locator "www.ford.com/vehicles/explorer.html" will take you to a specific page located within the "www.ford.com" website specific to Ford Explorer vehicle range. If you knew this address and you intended to only visit Fords website to view information on the "Explorer" you could immediately type in the designated web page address or URL in your web browser and immediately access the specific information without first having to visit the homepage "www.ford.com" to navigate through the websites different pages till you have found the page you wanted to visit.

While websites do provide a valuable resource to access product and company information, the process of searching and locating the page containing the information of choice is sometimes a tedious and ineffective task. Also, visitors who have been to the same website before, generally know their areas of interest within the website, but still have to follow the navigating process to reach their destinations, e.g. to access yahoo's sports page for tennis, a person would have to visit "www.yahoo.com", access the sports page then navigate to the tennis sports page and so on. One potential way to deal with this situation is to provide website visitors immediate access to the pages of their choice with a simple access process. Remembering the URL location of these pages could become difficult, so an alternative could be provided to make this process far more user friendly. An invention that allows web visitors to access a web page directly from either e-mail applications with the use of an e-mail address defining the location of a web page could provide a means to overcome these difficulties. E-mail addresses have the potential of defining individual locations of individual people, and are generally easier to remember. Also, it is a well-known fact that e-mail is used more often than the Internet with online users accessing their e-mail more frequently than they do the Internet.

Consumers have become more sophisticated about using the Internet. With Billions of dollars that marketers spend on advertising, consumers are more aware of the products and services they are interested in and are seeking ways of accessing this information more efficiently and effectively without having to search through web pages to find the information they want. If a consumer is interested in, for example, a specific mobile phone from Sony, it is obvious that this information would appear on the Sony website. Having a knowledge of this, could there not be a simple way of reaching this web page without having to navigate through the Sony website altogether, or in fact have the Sony website send this page to your e-mail instead?

The Internet has thus become an indispensable marketing tool for companies to reach their consumers. Today literally every product that is marketed and sold can be found on the Internet. Very few marketing and advertising campaigns exist today without mentioning their website address where more information can be found about the product being advertised. Also, the success of companies who market and sell products to consumers is dependent on understanding who their consumers are and what they think and react to products and the market. Unlike a conventional brick and mortar store, where consumers visit the store, allowing companies to see and understand who their consumers buying their products are, Internet websites will have millions of visitors viewing products in their web pages without giving any idea who these consumers are. Are they male or female? How old are they? This is because web browsers have no way of identifying individual web visitors.

Market research also provides an invaluable resource to understand consumers and their buying decisions. Predominantly, most market research conducted today is in physical contact with consumers fitting the profile of a client's business. Although these methods of research may be effective, they require great resources especially when a few thousand consumers are to be targeted for research. Also, these forms of research are expensive and involve lengthy processes that could take weeks to complete. Market research conducted online has made a dramatic difference to companies' research needs. Online surveys can reach visitors across various websites and can generate results within moments. Typical online research surveys include polling systems where consumers complete a "yes/no" question, to the more advanced research surveys that acts in a pop-up window that initiates as soon as you open a specific web page that has been programmed to display the survey. While consumers enjoy giving their opinion, web visitors find it sometimes annoying, because the research survey has no way of identifying who they are and whether or not they are, in a marketing sense, "qualified" to answer the research questions. Therefore, in certain instances, a visitor with intentions to offer some of their valuable time, discovers that after accessing an online survey, they are filling in information about credit card decisions in the US while they are actually from Australia.

The drawback to current online research is the inability to target specific research questionnaires to the exact demographic profiles of consumers you wish to target. To overcome some of these problems, researchers select websites that target consumers that best fit their research criteria. This however, is not entirely fool-proof and as a result online research remains a distant second choice to conventional research methodologies.

In the same way that website owners have no way of telling who the exact profiles of people are who are viewing their web pages, online researchers have no way of targeting research surveys to the exact consumers who would be "qualified" to answer their questions. Both website owners and researchers would benefit from a system that could overcome these difficulties.

On the other hand, consumers would also benefit from being able to access web page information without having to navigate through website pages to reach the pages they desire. A system that could alleviate these difficulties by providing consumer instant access to the web pages and information of choice without having to navigate through web pages could provide both consumers and website owners a valuable solution to increase the effectiveness and user friendliness of the Internet in general.

One method of informing potential clients about new products is by unsolicited e-mails, also known as spam. The negative effects of spam are that it is generally an irritation to consumers and/or that spam may be illegal.

It is the intension of current invention to provide a solution that will alleviate the above difficulties and provide for a way that will allow Internet users to instantly access web page information from their e-mail applications, as well as allow researchers and website owner the use of a system to identify the individual profiles and demographics of the consumers visiting their websites. The current invention further seeks to ameliorate the negative effects of spam.

SUMMARY OF THE INVENTION

According to one aspect of the invention there is provided a method of automatically relaying website information by e-mail across an electronic network, which method includes the following steps, in any order receiving a conventional e-mail request from a requester which e-mail is addressed to a specific electronic mailbox address assigned to specific website information, and which e-mail includes an electronic return address to which the website information is to be relayed to;

retrieving the website information from a web server which information is assigned to the specific mailbox address to which the received e-mail was addressed; and electronically mailing the website information retrieved from the web server to the return address, so that the requester receives the website information without having to search the network.

It is to be appreciated that, in this specification, a web server generally refers to any computer server which stores information that can be hosted on an electronic web, such as the Internet, or the like. Furthermore, an e-mail server refers to any server configured to manage the transmission and reception of conventional e-mail messages on a web, such as the Internet, or the like. Furthermore, it is to be appreciated that the functions of these respective servers are not limited to those mentioned above, and that the e-mail server may perform functions generally associated with conventional web servers, and that the web server may accordingly perform functions generally associated with conventional e-mail servers.

The method may include the step of, prior to receiving the request, the step of assigning a specific electronic mailbox address to specific website information. The website information may include a Uniform Resource Locator (URL). Similarly, the step of assigning the mailbox address may include assigning one mailbox address to a plurality of URL's. By receiving the e-mail request addressed to the mailbox address, it is then possible to retrieve that specific website information to which the address is assigned.

The step of receiving the e-mail request may be performed by a conventional e-mail server hosting the specific mailbox address assigned to the website information requested by the requester. The e-mail server typically hosts a plurality of e-mail addresses which are individually assigned to separate and specific website information.

The step of retrieving information may include accessing a web server which stores the specific website information. The web server typically hosts the website information as a conventional website. The website information may consist of at least one webpage. It is to be appreciated that the website information is typically a number of webpages assigned to the mailbox address. The e-mail server may be separate from the web server. Otherwise, the e-mail server and the web server may be included in a single combined server.

The method may include the step of, prior to mailing the information, the step of converting the website information into a certain format. The format may include a conventional e-mail format, e.g. a format which is viewable with an e-mail application. The e-mail request may specify the format in which the website information is to be mailed to the return address, e.g. the subject line of the e-mail may request a certain format in which the information is to be mailed. The step of mailing the website information to the return address may include attaching the retrieved website information as an attachment to the e-mail sent to the return address.

According to a second aspect of the invention there is provided a system for automatically relaying website information across an electronic network, as described in the method above, which system includes at least one conventional web server which hosts specific website information; and
  at least one conventional e-mail server for receiving a conventional e-mail request from a requester, which e-mail server is arranged in electronic communication with the web server, wherein the e-mail server hosts an e-mail address to which the received e-mail request is addressed which address is assigned to the specific website information and which e-mail request further includes an electronic return address to which the website information is to be relayed to, wherein the e-mail server is configured to retrieve the website information from the web server, and which e-mail server electronically mails the retrieved website information to the return address, so that the requester receives the website information without having to search the network.

The e-mail server may retrieve the electronic information from the web server by assigning a specific electronic mailbox address to specific website information hosted by the web server. The website information may include a Uniform Resource Locator (URL). Similarly, the e-mail server may assign one mailbox address to a plurality of URL's. The e-mail server may retrieve the information from the web server by the web server, in response to a communication from the e-mail server, transmitting the information to the e-mail server.

The e-mail server and/or the web server may be configured to, prior to mailing the information, convert the website information into a certain format. The format may include a conventional e-mail format, e.g. a format which is viewable with an e-mail application. Otherwise, the e-mail server may attach the retrieved website information to the e-mail sent to the return address. Similarly, the web server may compile the information into a certain format before transmitting the information to the e-mail server.

The e-mail server and the web server may be included in a single combined server.

According to a third aspect of the invention there is provided a method of conducting research on an electronic network, which method includes a first method including the following steps, in any order receiving a conventional e-mail request from a requester which e-mail is addressed to a specific electronic mailbox address assigned to specific electronic information, which e-mail further includes an electronic return address to which the electronic information is to be relayed to;
  verifying whether or not the return address has previously been registered on a server so as to enable monitoring of information requested by a particular requester, and if not, the further step of registering the return address on a server;
  retrieving the electronic information from an information server which information is assigned to the specific mailbox address to which the received e-mail was addressed;
  electronically mailing the electronic information retrieved from the information server to the return address, so that the requester receives the information without having to search the network; and
  compiling a profile related to the registered return address according to the electronic information mailed to the return address so that the profile is usable for market research purposes.

The step of verifying whether or not the return address has previously been registered on a server may include verifying the return address on an e-mail and/or an information server. Similarly, the further step of registering the return address on a server may include registering the address on an e-mail server and/or an information server.

The method may include the step of, prior to receiving the request, the step of assigning a specific electronic mailbox address to specific electronic information. It is to be appreciated that the step of retrieving the information from the information server may be facilitated by the step of assigning a specific address to specific information.

The step of receiving the e-mail request may be performed by a conventional e-mail server hosting the specific mailbox address assigned to the electronic information.

The step of verifying whether or not the return address has previously been registered on an e-mail server and/or an information server may include comparing the return address to a list of valid return addresses stored by an e-mail server and/or information server. It is to be appreciated that the valid return addresses are generally return addresses which have been previously registered.

The step of registering a requester may include registering personal particulars of a requester on an e-mail server and/or information server, e.g. age, interests, location, race, gender, occupation, and/or the like. The personal particulars of the requester may be obtained by, prior to retrieving the information, the step of transmitting an electronic form to the return address which form is to be completed by the requester. Accordingly, the method may include the step of receiving the electronic form from the requester and combining the personal particulars with the return address of the requester so as to form a customer or market profile of that requester. It is to be appreciated that the profile may typically include details such as the name, age, country, region, income, hobbies, interests, race, gender, intended purchases, and/or any similar particulars generally used in market research.

The step of retrieving the electronic information may be performed by accessing an information server, such as a web server hosting website information, or any similar server which hosts information in which the requester may be interested. Otherwise, the step of retrieving the electronic information may be performed by the information server, in response to a communication from the e-mail server, transmitting the information to the e-mail server.

The step of mailing the retrieved information is typically performed by a conventional e-mail server. The step of mailing the information may include first converting the retrieved information into a certain format before mailing it to the return address. It is to be appreciated that the format may include any suitable electronic format in which information can be mailed to an e-mail address, such as HTML, TXT, and/or the like. It is to be appreciated that the step of converting the information may be performed by the e-mail server and/or the information server.

The step of compiling a profile may include monitoring the information e-mailed to a particular return address over a period of time and electronically indicating on the profile the type of information requested so that a history of requests is formed. It is to be appreciated that such a profile of a requester includes the personal particulars of that requester along with a history of requests made by the requester, and that this profile is useable for market research purposes.

The step of compiling the profile may also include the step of submitting an electronic questionnaire along with the e-mailed information to the return address which questionnaire is based on the history of requests made by that particular requester. For example, a requester has previously requested information about cars, and in his next request a questionnaire is included asking questions relating to cars. It is to be appreciated that the request which includes the questionnaire about cars, need not necessarily relate to cars. The questionnaire may also be based on the personal particulars of a requester.

Accordingly, the method may include the further step of receiving the completed questionnaire from the requester, and updating the profile of the requester with any relevant information contained in the completed questionnaire to form a more detailed profile of the requester.

The method for conducting research may include the further step of performing a plurality of first methods for different customers, and the step of updating a global requester profile database from an e-mail server and/or an information server of each method so that a global database of profiles is created for market research purposes.

The step of verifying whether or not a return address of a requester has previously been registered may include checking if the return address is registered on a global server. It is to be appreciated that the return address of a requester is only required to be registered once. After first registration, the global server updates the global requester profile database to include any new return addresses. An e-mail server and/or information server is then able to access the global database to ascertain whether or not a return address has previously been registered.

The step of updating the global database may include receiving an update from an e-mail server and/or an information server after the step of e-mailing information to a return address. Otherwise, the step of updating the global server may include the global database periodically accessing an e-mail server and/or information server to update the profiles in the global database with any new requester particulars or history of requests stored by the e-mail server and/or information server.

According to a fourth aspect of the invention there is provided a system for conducting research on an electronic network, as described above, which system includes a first system for different customers including a conventional information server which hosts specific electronic information; and a conventional e-mail server for receiving a conventional e-mail request from a requester which e-mail is addressed to a specific electronic mailbox address assigned to the specific electronic information and which e-mail further includes an electronic return address to which the electronic information is to be relayed to, wherein the e-mail server is arranged in communication with the information server to form a server arrangement which is configured to verify whether or not the return address has previously been registered on a server so as to enable monitoring of information requested by a particular requester, and if not, to register the return address on a server;

to retrieve the specific electronic information from the information server which is assigned to the specific mailbox address to which the received e-mail was addressed;

to electronically mail the retrieved electronic information to the return address so that the requester receives the information without having to search the network; and to compile a profile related to the registered return address according to the electronic information mailed to the return address so that the profile is usable for market research purposes.

The server arrangement may verify whether or not the return address has previously been registered on a server by verifying the return address on the e-mail server and/or the information server. Similarly, the server arrangement may register the return address on the e-mail server and/or the information server.

The server arrangement may retrieve the information from the information server by the e-mail server accessing the information server to obtain the information. Otherwise, the information server may, in response to a communication from the e-mail server, transmit the information to the e-mail server.

The information server may include a web server which hosts the electronic information as a website, i.e. webpages and/or web content. The server arrangement is generally connected to an electronic web such as the Internet.

The server arrangement may be adapted to, prior to receiving the request, assign a specific electronic mailbox address to specific electronic information.

The e-mail server may be adapted to receive the e-mail request by hosting the specific mailbox address assigned to the electronic information.

The server arrangement may be adapted to verify whether or not the return address has previously been registered on the e-mail server and/or information server by comparing the return address to a list of valid return addresses stored by the e-mail server and/or information server, respectively.

The server arrangement may be adapted to register a requester by registering personal particulars of a requester on the server arrangement, e.g. age, interests, location, occupation, and/or the like. It is to be appreciated that the server arrangement registers the requester by storing the return address on the e-mail server and/or information server. The personal particulars of the requester may be obtained by, prior to retrieving the information, transmitting an electronic form to the return address which form is to be completed by the requester. Accordingly, the e-mail server may receive the electronic form from the requester and the server arrangement then combines the personal particulars with the return address of the requester so as to form a detailed profile of that requester. It is to be appreciated that the profile may typically include details such as the name, age, country, region, income, hobbies, interests, race, gender, intended purchases, and/or any similar particulars generally used in market research.

The server arrangement may first convert the retrieved information into a certain format before mailing it to the return address. It is to be appreciated that the format may include any suitable electronic format in which information can be mailed to an e-mail address, such as HTML, TXT, and/or the like.

The server arrangement may be adapted to compile a profile by monitoring the information e-mailed to a particular return address over a period of time and electronically indicating on the profile the type of information requested so that a history of requests is formed. It is to be appreciated that such a profile of a requester includes the personal particulars of that requester along with a history of requests made by the requester, and that this profile is useable for market research purposes.

The server arrangement may compile the profile by submitting an electronic questionnaire along with the information to the return address which questionnaire is based on the history of requests and/or profile details of that particular requester. For example, a requester has previously requested information about cars, and in his next request a questionnaire is included asking questions relating to cars. It is to be appreciated that the request which includes the questionnaire about cars, need not necessarily relate to cars.

Accordingly, the e-mail server may receive the completed questionnaire from the requester, and the server arrangement then update the profile of the requester with any relevant information contained in the completed questionnaire.

The system for conducting research may further include
  a plurality of first systems, as described above, for different customers; and
  a global server arranged in electronic communication with the plurality of first systems which global server is configured to update a global requester profile database with requester profiles from the server arrangement of the plurality of first systems so that a global database of profiles is created for market research purposes.

The server arrangement of a first system may verify whether or not the return address has been previously registered by checking if the return address is registered on that particular server arrangement.

Accordingly, the server arrangement of the first system may verify whether or not a return address of a requester has previously been registered by checking if the return address is registered on the global server. It is to be appreciated that the return address of a requester is only required to be registered once on any one of the server arrangements of the plurality of first systems. After first registration, the global server updates the global requester profile database to include any new return addresses. Any server arrangement of a first system is then able to access the global database to ascertain whether or not a return address has previously been registered.

It is to be appreciated that the server whereby the registration of a return address is verified and, if not registered, the subsequent registration thereof, may accordingly include the e-mail server of the server arrangement, the information server of the server arrangement, and the global server.

It is further to be appreciated that, when an e-mail server of a first system receives a request, the server arrangement will typically first check whether or not the return address is registered on that server arrangement, and if not, the server arrangement will check the global server to see if the return address is registered before registering the return address.

The global server may be a single conventional computer server. Otherwise, the global server may include a plurality of conventional computer servers arranged in communication to form a single global server.

It is to be appreciated that by having a global server, a requester is only required to register once. Thereafter, a server arrangement of a first system will automatically determine from the global server that the return address is valid and any requests made by the particular requester will update his profile accordingly on the global server.

The global server may update the global profile database by receiving an update from the server arrangement of a first system when information is e-mailed to a return address. Otherwise, the global server may update the database by periodically accessing the server arrangement of the first system and updating the profiles in the global database with any new requester particulars or history of requests stored by the server arrangement.

It is to be appreciated that a requester may be individually registered on the server arrangement of a plurality of first systems, and that the global server typically cross references these registration details between the server arrangements of the first systems on the global database to enable the compiling of a more detailed profile on the global database than a profile stored individually on a single server arrangement. Similarly, a server arrangement of a first system may check the global database to ascertain if the server arrangement has an up-to-date profile of a requester.

BRIEF DESCRIPTION OF THE DRAWINGS

The invention is now described, by way of non-limiting example, with reference to the accompanying drawings wherein.

DETAILED DESCRIPTION OF THE INVENTION

Figure 1:
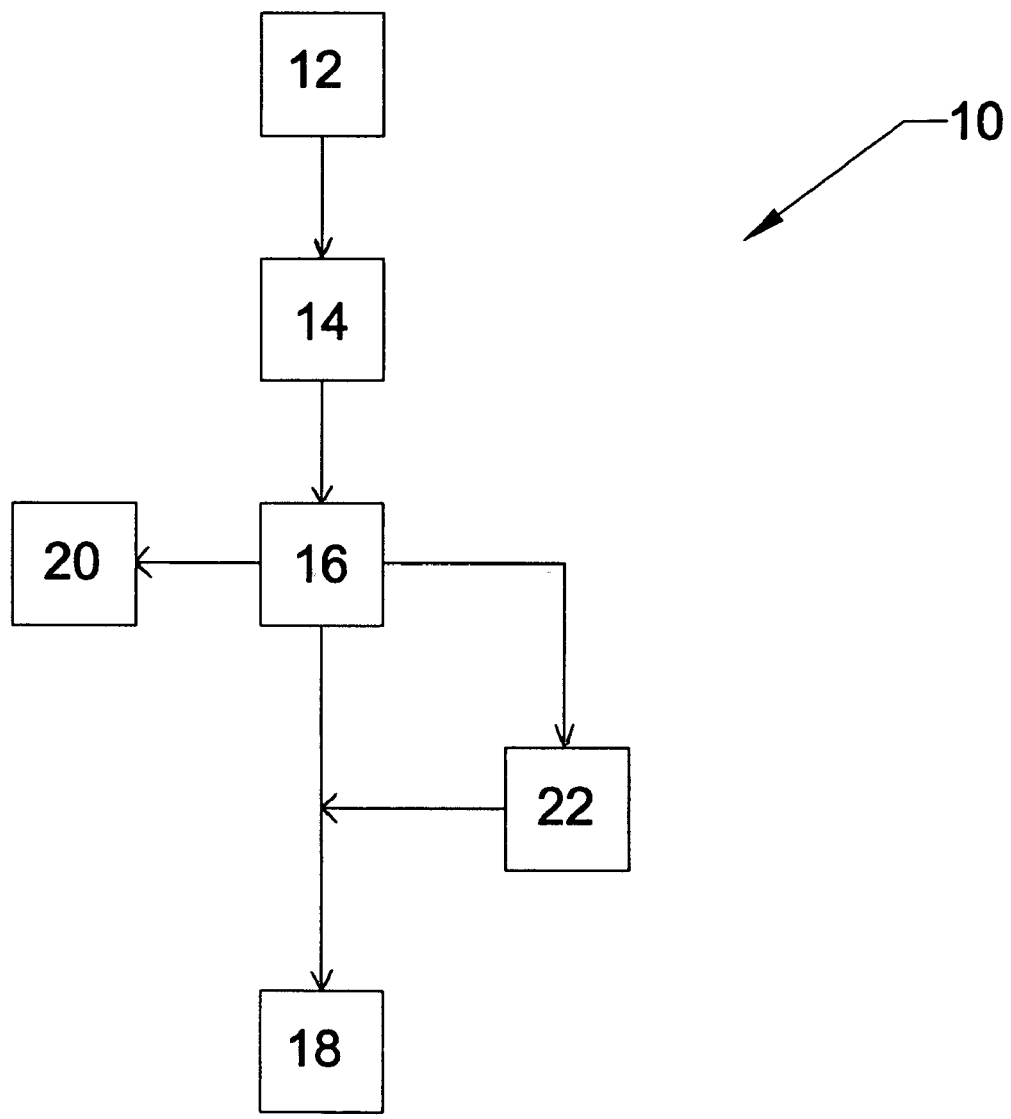
FIG. 1 shows a schematic block diagram for a method of automatically relaying website information across an electronic network, in accordance with the invention.

With reference to FIG. 1, a method of automatically relaying website information by e-mail across an electronic network, in accordance with the invention, is generally indicated by reference numeral 10.

The method 10 includes the steps of receiving 14 a conventional e-mail request from a requester which e-mail is addressed to a specific electronic mailbox address assigned to specific website information, and which e-mail includes an electronic return address to which the website information is to be relayed to. The method 10 then includes the step of retrieving 16 the website information from a web server which information is assigned to the specific mailbox address to which the received e-mail was addressed. The method 10 then features the step of electronically mailing 18 the website information retrieved from the web server to the return address, so that the requester receives the website information without having to search the network.

It is to be appreciated that the requester receives the website information simply by sending an e-mail to the address. The method 10 eliminates searching the Internet, which takes time and patience.

In the preferred embodiment of the invention, the e-mail request does not include any text save for the mailbox address. It is to be appreciated that the mailbox address to which the request is addressed is associated with specific website information, e.g. a mailbox address might be "audis3@audi.com" which is then associated with information concerning the Audi S3 motor vehicle. Similarly, an address may be associated with any type of information, such as products, services, and/or the like.

In this embodiment, the method 10 also includes the step of, prior to receiving 14 the request, the step of assigning 12 a specific electronic mailbox address to specific website information. The website information typically includes a Uniform Resource Locator (URL). Similarly, a single address may be assigned 12 to a plurality of URL's. By receiving 14 the e-mail request addressed to the mailbox address, it is then possible to retrieve 16 that specific website information to which the address is assigned. Accordingly, the method 10 then facilitates accepting new customers for the service provided by this method 10, i.e. signing new website content from customers. It is to be appreciated that a customer refers to any entity that wishes to distribute information across the network, for example a company that produces and sells products, or the like.

The step of receiving 14 the e-mail request is generally performed by a conventional e-mail server hosting the specific mailbox address. It is to be appreciated that the e-mail server typically hosts a plurality of e-mail addresses which are individually assigned 12 to separate and specific website information, e.g. an address for a shoe company's products, an address for a car manufacturer's products, or the like.

The step of retrieving 16 information is generally done by accessing 20 a web server which stores the specific website information. The web server typically hosts the website information as a conventional website, so that the website information consists of at least one webpage. It is to be appreciated that the website information is typically a number of webpages assigned to a specific mailbox address. The e-mail server may be separate from the web server, or the e-mail server and the web server may be included in a single combined server.

In this embodiment, the method 10 further includes the step of, prior to mailing 18 the information, the step of converting 22 the website information into a certain format. The format is typically a conventional e-mail format, e.g. a format which is viewable with an e-mail application. It is to be appreciated that, in a further embodiment, the e-mail request may specify the format in which the website information is to be mailed 18 to the return address, e.g. the subject line of the e-mail may request a certain format in which the information is to be mailed.

The step of mailing 18 the website information to the return address may also include attaching the retrieved website information as an attachment to the e-mail sent to the return address. It is to be appreciated that the step of mailing 18 may include a conventional auto-response function of an e-mail server, or the like.

It is to be appreciated that the step of mailing 18 the website information to the return address is similar to an automatic response function of conventional e-mail applications. These auto response applications do not have the ability to uplift specific requested information from a separate web server, as their response is predetermined in the respective e-mail server.

Figure 2:
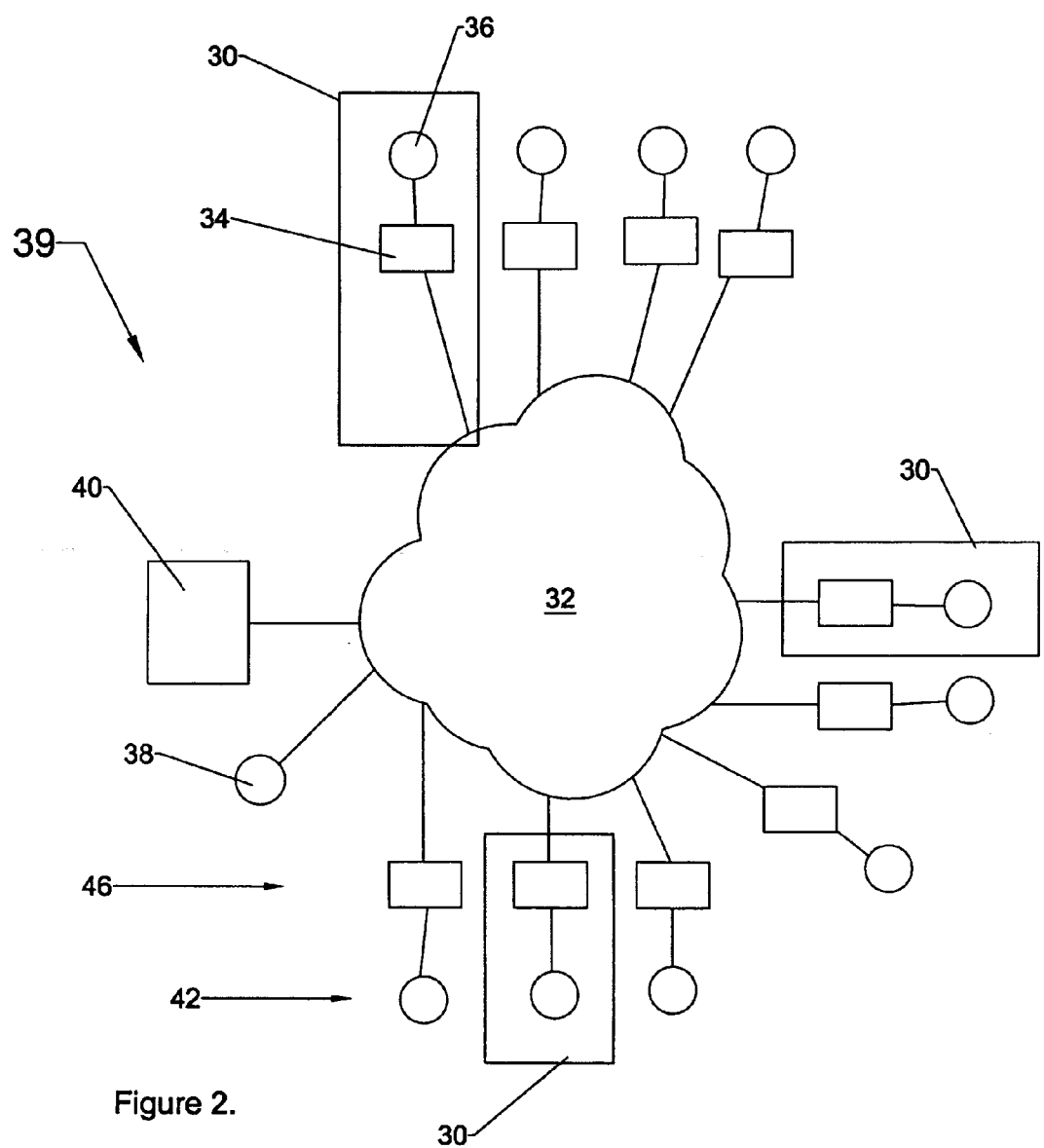
FIG. 2 shows, in schematic view, a system which includes a plurality of first systems for relaying electronic information across and electronic network which system is for conducting research on the network, in accordance with the invention.

FIG. 2 shows the associated system 30 for automatically relaying the website information across an electronic network 32, as described in the method 10 above. The system 30 includes a conventional web server 36 which hosts specific website information, and a conventional e-mail server 34 arranged in electronic communication with the web server 36. It is to be appreciated that the network 32 generally represents the Internet. Furthermore, the embodiment shown in FIG. 2 shows the e-mail server 34 in direct communication with the web server 36, but that the e-mail server 34 and the web server 36 may be connected via the network 32.

Similarly, according to the method 10 of FIG. 1, the e-mail server 34 hosts an e-mail address assigned to the specific website information and is adapted to receive a conventional e-mail request from a requester 38 which e-mail is addressed to the hosted e-mail address and which request further includes an electronic return address to which the website information is to be relayed to. The e-mail server 34 is further adapted to retrieve the website information from the web server 36, and to electronically mail the retrieved website information to the return address, so that the requester 38 receives the website information without having to search the network 32, typically the Internet.

It is to be appreciated that each e-mail server 34 will retrieve the requested information from its associated web server 36 of system 30, as indicated by the grouping of components inside the block denominated by reference numeral 30, and not from a web server of another similar system 30 shown in plurality in FIG. 2.

In the embodiment shown, the e-mail server 34 is configured to assign a specific electronic mailbox address to specific website information hosted by the web server 36. The website information includes a Uniform Resource Locator (URL). Similarly, the e-mail server 34 may also assign one mailbox address to a plurality of URL's.

The e-mail server 34 may also be configured to, prior to mailing 18 the information, convert the website information into a certain format, such as a conventional e-mail format, e.g. a format which is viewable with an e-mail application. Otherwise, the e-mail server 34 may attach the retrieved website information to the e-mail and send it to the return address. It is further to be appreciated that the e-mail server may mail the information to the return address by being configured as a conventional auto-responder, or the like.

It is to be appreciated that the e-mail server 34 and the web server 36 may be included in a single combined server. This will typically be the case where a customer is a small entity that has a single computer server to perform the functions of a web server and e-mail server.

Figure 3:
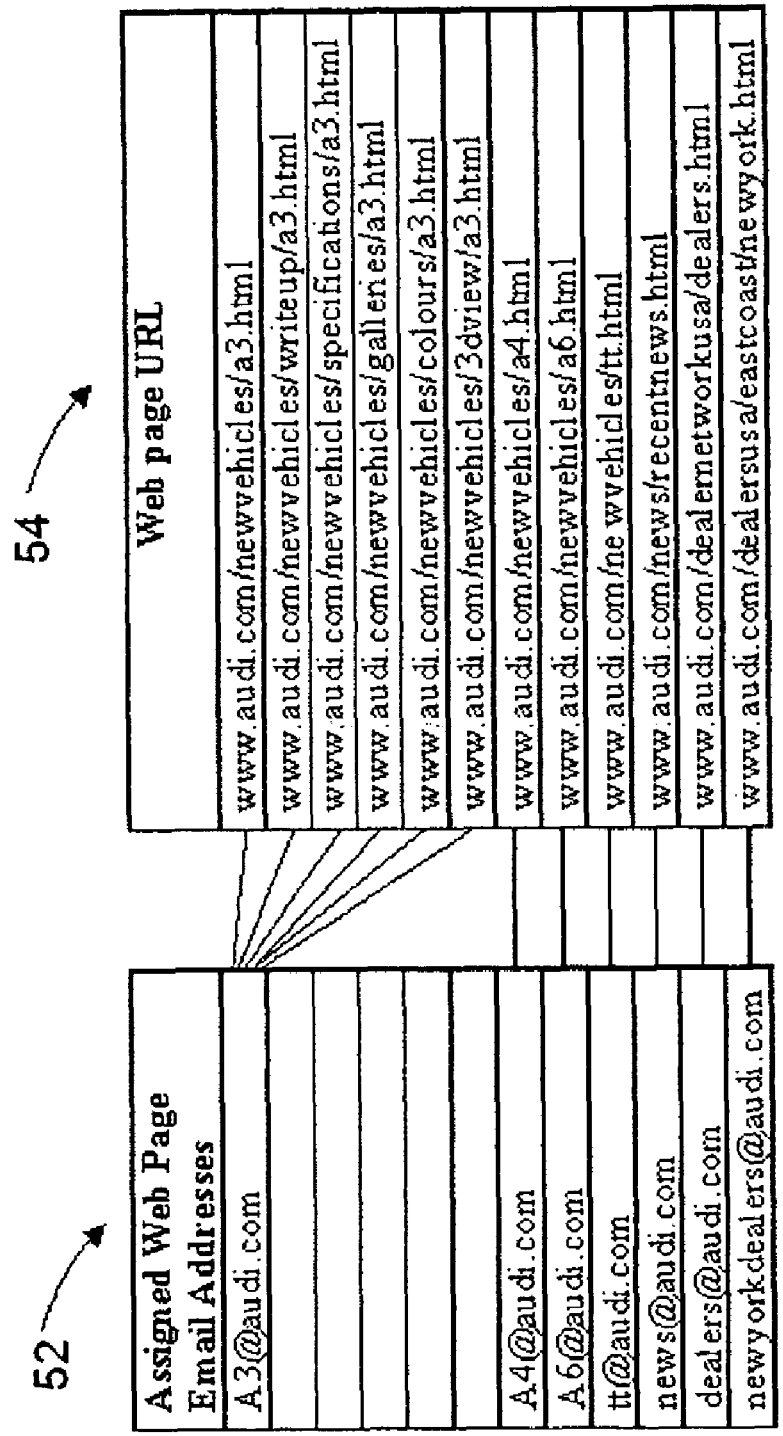
FIG. 3 shows an example of electronic mailbox addresses assigned to specific electronic information.

FIG. 3 shows an example of how an electronic mailbox address is typically assigned to website information. The first column 52 shows examples of mailbox addresses, and the second column 54 shows URL's assigned to the mailbox addresses in column 52. As shown, the first mailbox address "A3@audi.com" in column 52 is associated with the first six URL's in column 54. The second mailbox address "A4@audi.com" is assigned to the URL "www.audi.com/newvehicles/a4.html", and so on. It is to be appreciated that a single mailbox address may be assigned to a plurality of URL's. This is typically the case where a certain product described by the website information has a plurality of webpages.

Figure 4:
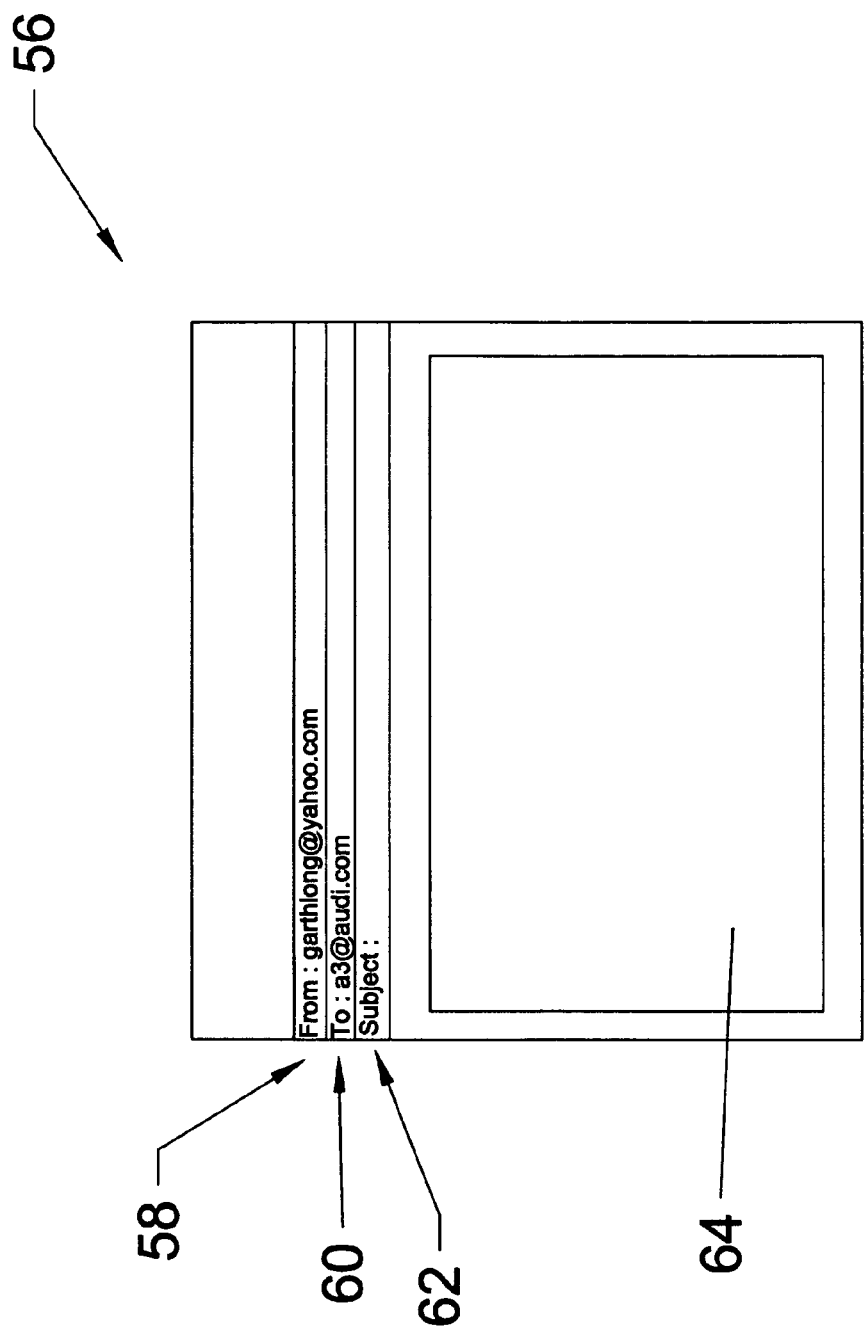
FIG. 4 shows a schematic representation of a conventional e-mail request for requesting electronic information.

FIG. 4 shows a schematic screenshot 56 of a conventional e-mail application. In this embodiment, the e-mail 56 is sent from "garthlong@yahoo.com" as shown by reference numeral 58. In this example, this is the return address for the requested information. It is to be appreciated that this return address is typically automatically generated by the software e-mail application according to the setup of the requester's computer, i.e. this address is automatically added whenever a requester composes an e-mail. In this example, the electronic mailbox address associated with the electronic information is "a3@audi.com" shown by reference numeral 60. In the embodiment shown, the subject line 62 of the e-mail 56 is left blank along with the body 64 of the e-mail 56. In other embodiments (not shown), the subject line 62 may specify a certain format in which the electronic information is to be mailed to the return address, or the body of the e-mail 64 may specify a different return address than the one in line 58, such as when a registered requester uses a different e-mail than his regular one to send a request, and/or the like.

Figure 5:
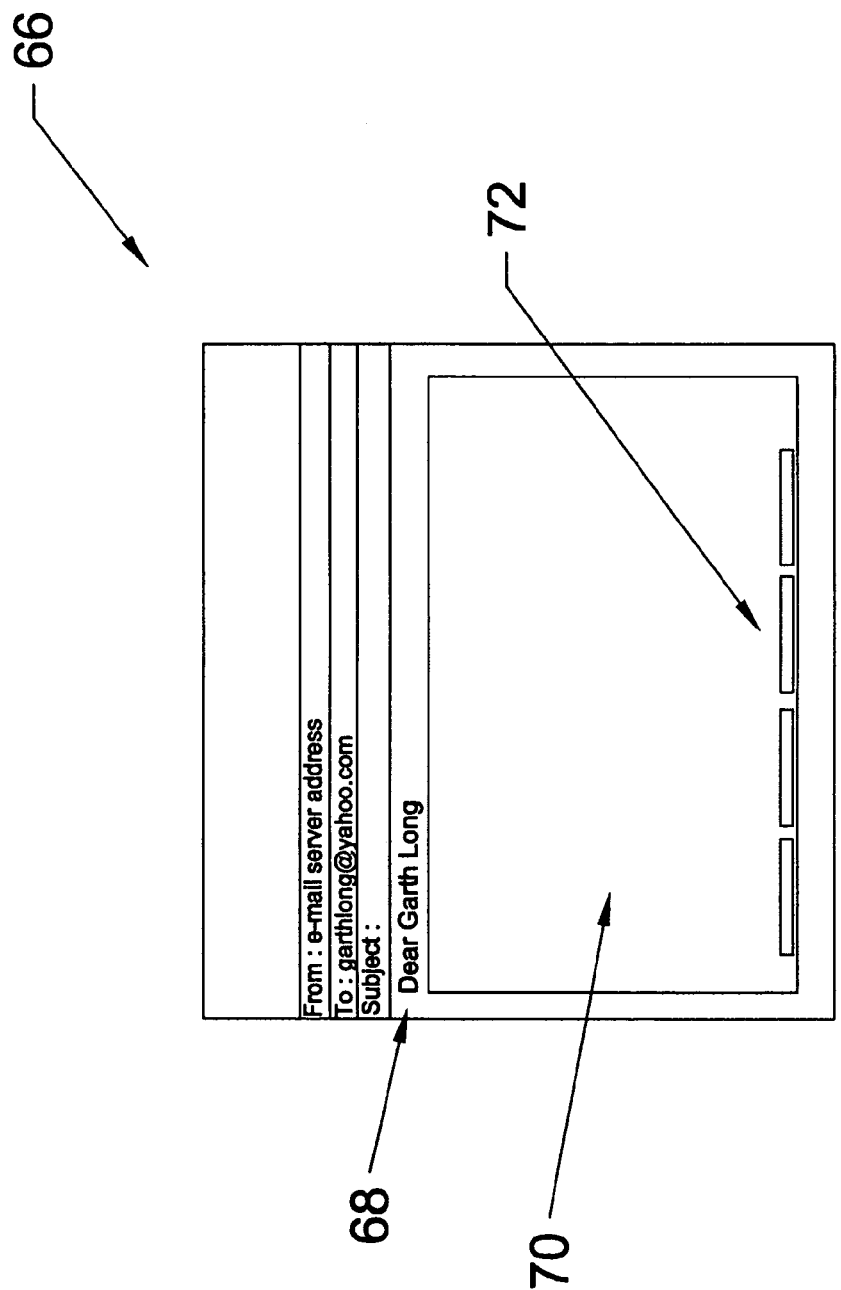
FIG. 5 shows a schematic representation of how electronic information is relayed using a conventional e-mail application.

FIG. 5 shows a schematic representation 66 of website information which has been mailed by the system 30 to the return address of a requester 38. In this example, the information was relayed in an e-mail format which the requester 38 can view using a conventional e-mail application. The relayed information is personalized for the requester 38 according to the registration details supplied by the requester when he registered for the first time. As shown, the e-mail 66 includes a name field 68. The information further includes additional links 72 to other electronic information, which links 72 provides all the URL links to which the e-mail address has been assigned to extract from the web site and return to the recipient. It is to be appreciated that the links 72 enables a requester 38 to conventionally surf the internet by clicking on these links 72.

Figure 6:
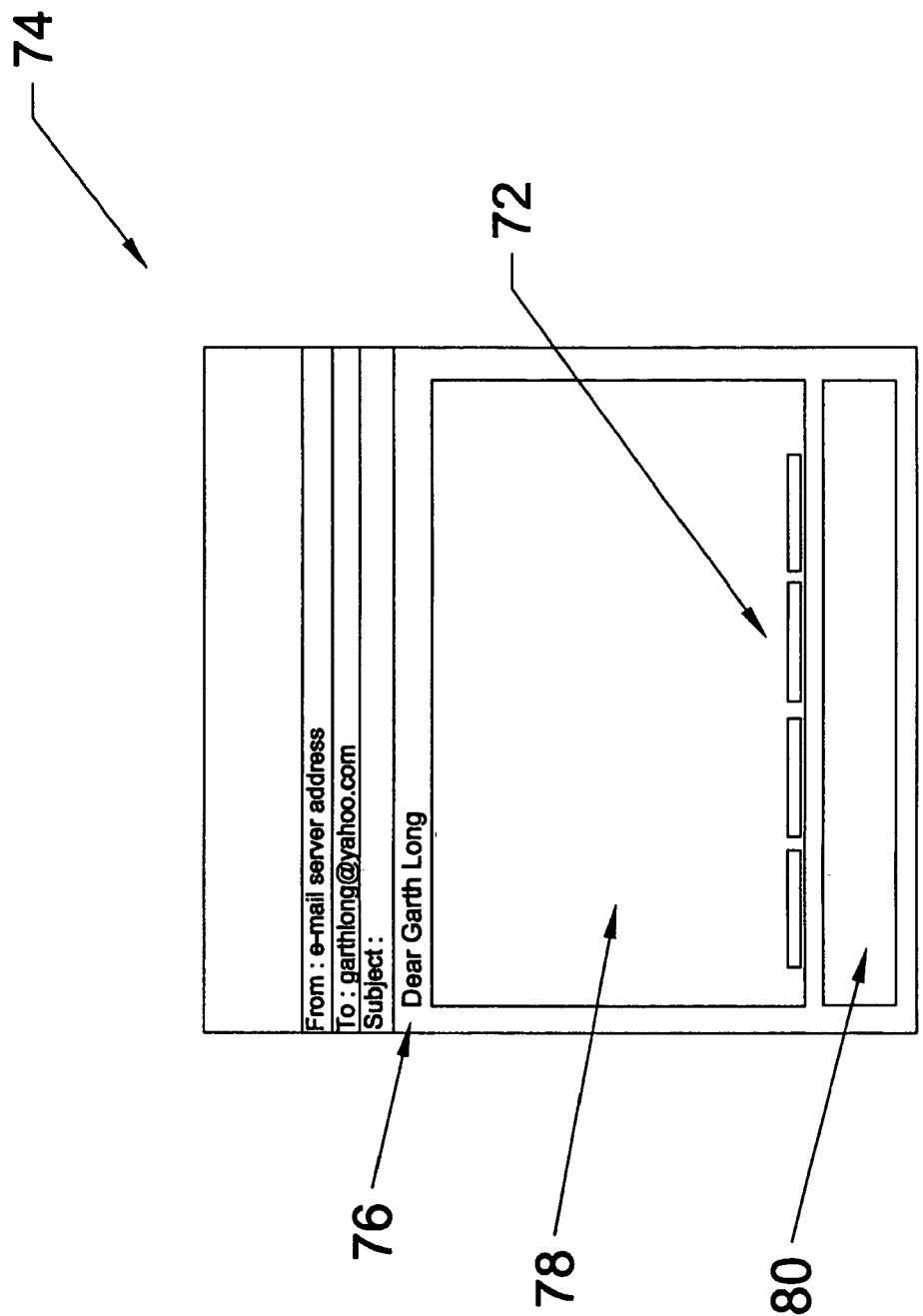
FIG. 6 shows a schematic representation of an electronic questionnaire incorporated into a conventional e-mail for market research purposes.

FIG. 6 shows a schematic representation 74 of another example of specific website information 78. This embodiment also includes a name field 76 which is personalized according to the registration information or profile of the requester 38. In this embodiment, the information includes an electronic questionnaire 80 for market research purposes. In this example, the questionnaire 80 is an electronic link to a further URL, but it is to be appreciated that the questionnaire may be incorporated in the electronic information 78.

Figure 7:
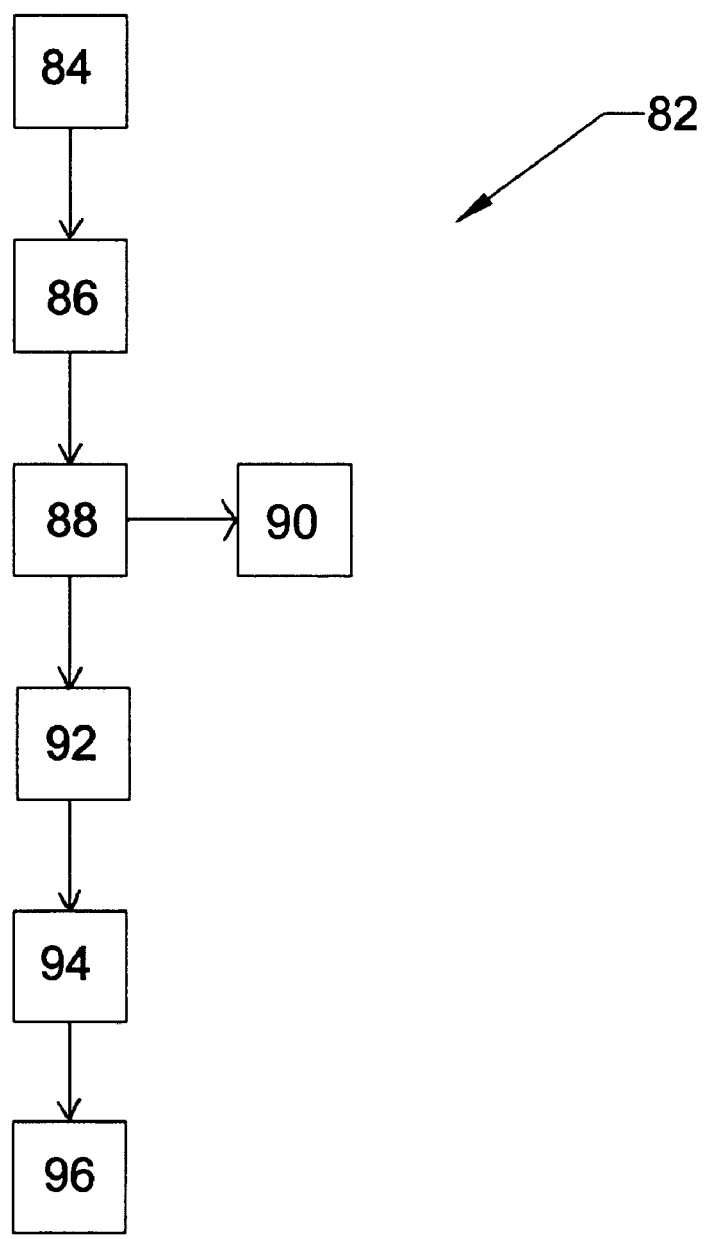
FIG. 7 shows a schematic block diagram for a first method of conducting research on a network.

FIG. 7 shows a first method 82 of conducting research on an electronic network 32, which method includes following steps of receiving 86 a conventional e-mail request from a requester which e-mail is addressed to a specific electronic mailbox address assigned to specific electronic information, which e-mail further includes an electronic return address to which the electronic information is to be relayed to. The method 82 also includes the steps of verifying 88 whether or not the return address has previously been registered on a server so as to enable monitoring of information requested by a particular requester, and if not, the further step of registering 90 the return address on a server, and the step of retrieving 92 the electronic information from an information server which information is assigned to the specific mailbox address to which the received e-mail was addressed, and electronically mailing 94 the electronic information retrieved from the information server to the return address, so that the requester receives the information without having to search the network. The method 82 also has the step of compiling 96 a profile related to the registered return address according to the electronic information mailed 94 to the return address so that the profile is usable for market research purposes.

The method 82 also includes the step of, prior to receiving 86 the request, the step of assigning 84 a specific electronic mailbox address to specific electronic information, as described in the method of FIG. 1.

The step of receiving 86 the e-mail request is generally performed by a conventional e-mail server hosting the specific mailbox address assigned to the electronic information.

It is to be appreciated that the method of FIG. 7 is substantially similar to the method of FIG. 1, with the exception that the method 82 of FIG. 7 includes steps facilitating the registration of return addresses of requesters, and the subsequent monitoring of requests made by requesters. This finds particular application in the field of market research.

Accordingly, the step of verifying 88 whether or not the return address has previously been registered on a server includes comparing the return address to a list of valid return addresses stored by an e-mail server and/or information server.

The step of registering 90 a requester includes registering personal particulars of a requester on an e-mail server and/or information server, e.g. age, interests, location, race, gender, occupation, and/or the like. The personal particulars of the requester may be obtained by, prior to retrieving 92 the information, the step of transmitting (not shown) an electronic form to the return address which form is to be completed by the requester.

Accordingly, the method 82 then includes the step of receiving (not shown) the electronic form from the requester and combining the personal particulars with the return address of the requester so as to form a customer or market profile of that requester. It is to be appreciated that the profile typically includes details such as the name, age, country, region, income, hobbies, interests, race, gender, intended purchases, and/or any similar particulars generally used in market research.

The step of retrieving 92 the electronic information is generally performed by accessing an information server, such as a web server hosting website information, or any similar server which hosts information in which the requester may be interested. Otherwise, the step of retrieving 93 the information may be performed by the information server, in response to a communication from an e-mail server, transmitting the information to the e-mail server.

The step of mailing 94 the retrieved information is typically performed by a conventional e-mail server. The step of mailing 94 the information may include first converting the retrieved information into a certain format before mailing it to the return address, such as any suitable electronic format in which information can be mailed to an e-mail address, such as HTML, TXT, and/or the like. Otherwise, the information may be mailed to the return address as a conventional e-mail attachment.

The step of compiling 96 a profile includes monitoring the information e-mailed to a particular return address over a period of time and electronically indicating on the profile the type of information requested so that a history of requests is formed. It is to be appreciated that such a profile of a requester includes the personal particulars of that requester along with a history of requests made by the requester, and that this profile is useable for market research purposes.

The step of compiling 96 the profile may further include the step of submitting (not shown) an electronic questionnaire along with the e-mailed information to the return address which questionnaire is based on the history of requests made by that particular requester. For example, a requester has previously requested information about cars, and in his next request a questionnaire is included asking questions relating to cars. It is to be appreciated that the request which includes the questionnaire about cars, need not necessarily relate to cars. In this manner it is possible to conduct highly effective market research targeted at specific requesters. For example, a customer can draft a questionnaire according to the original requester registration and according to individual products, so that the questionnaire is only sent to certain requesters, e.g. the questionnaire is sent to requester of a certain age who has previously requested a certain product's information.

Accordingly, the method 82 may include the further step of receiving (not shown) the completed questionnaire from the requester, and updating the profile of the requester with any relevant information contained in the completed questionnaire to form a more detailed profile of the requester.

A global method (not shown) for conducting research on a global scale may include the step of performing a plurality of first methods 82 for different customers, and the step of updating a global requester profile database from a server of each method so that a global database of profiles is created for market research purposes. In other words, this global method is then conducted by performing the first method 82 for a plurality of customers and updating a global database with the individual profiles generated for individual requesters according to the first method 82.

Accordingly, the first method's step of verifying 88 whether or not a return address of a requester has previously been registered may include checking if the return address is registered on the global server. It is to be appreciated that the return address of a requester is only required to be registered once. After first registration, the global server updates the global requester profile database to include any new return addresses. An e-mail server and/or information server is then able to access the global database to ascertain whether or not a return address has previously been registered.

The step of updating the global database may include receiving an update from an e-mail server and/or information server after the step of e-mailing 94 information to a return address. Otherwise, the step of updating the global server may include the global database periodically accessing an e-mail server and/or information server to update the profiles in the global database with any new requester particulars or history of requests stored by the e-mail server and/or information server, respectively. For example, the global server will access each e-mail and/or information server to check for an updated requester profile as identified by the return address of that requester.

Referring once again to FIG. 2, this figure shows a global system 39 for conducting research on the electronic network 32, as described above. The system 39 includes a first system 30 for different customers, wherein the first system 30 includes a conventional information server 36 which hosts specific electronic information, and a conventional e-mail server 34 for receiving a conventional e-mail request from a requester 38 which e-mail is addressed to a specific electronic mailbox address assigned to the specific electronic information and which e-mail further includes an electronic return address to which the electronic information is to be relayed to.

The e-mail server 34 is arranged in communication with the information server 36 to form a server arrangement 30 which is configured to verify whether or not the return address has previously been registered on a server so as to enable monitoring of information requested by a particular requester 38, and if not, to register the return address on a server. The arrangement 30 is also configured to retrieve the specific electronic information from the information server 36 which is assigned to the specific mailbox address to which the received e-mail was addressed. The arrangement 30 is also configured to electronically mail the retrieved electronic information to the return address so that the requester 38 receives the information without having to search the network 32, and to compile a profile related to the registered return address according to the electronic information mailed to the return address so that the profile is usable for market research purposes.

The server arrangement 30 verifies whether or not the return address has previously been registered on a server by verifying the return address on the e-mail server 34 and/or the information server 36. Similarly, the server arrangement 30 may register the return address on the e-mail server 34 and/or the information server 36.

The server arrangement 30 may retrieve the information from the information server 36 by the e-mail server 34 accessing the information server 36 to obtain the information. Otherwise, the information server 36 may, in response to a communication from the e-mail server 34, transmit the information to the e-mail server 34.

The information server 36 may include a web server which hosts the electronic information as a website, i.e. webpages and/or web content. The server arrangement 30 is generally connected to an electronic web 32 such as the Internet.

The server arrangement 30 may be adapted to, prior to receiving the request, assign a specific electronic mailbox address to specific electronic information.

The e-mail server 34 is adapted to receive the e-mail request by hosting the specific mailbox address assigned to the electronic information.

The server arrangement 30 is adapted to verify whether or not the return address has previously been registered on the e-mail server 34 and/or information server 36 by comparing the return address to a list of valid return addresses stored by the e-mail server 34 and/or information server 36, respectively.

The server arrangement 30 registers a requester 38 by registering personal particulars of the requester 38 on the server arrangement 30, e.g. age, interests, location, occupation, and/or the like. It is to be appreciated that the server arrangement 30 registers the requester 38 by storing the return address on the e-mail server 34 and/or information server 36. The personal particulars of the requester 38 may be obtained by, prior to retrieving the information, transmitting an electronic form to the return address which form is to be completed by the requester 38. Accordingly, the e-mail server 34 may receive the electronic form from the requester 38 and the server arrangement 30 then combines the personal particulars with the return address of the requester 38 so as to form a detailed profile of that requester 38. It is to be appreciated that the profile may typically include details such as the name, age, country, region, income, hobbies, interests, race, gender, intended purchases, and/or any similar particulars generally used in market research.

The server arrangement 30 may first convert the retrieved information into a certain format before mailing it to the return address. It is to be appreciated that the format may include any suitable electronic format in which information can be mailed to an e-mail address, such as HTML, TXT, and/or the like.

The server arrangement 30 is generally adapted to compile a profile by monitoring the information e-mailed to a particular return address over a period of time and electronically indicate on the profile the type of information requested so that a history of requests is formed. It is to be appreciated that such a profile of a requester includes the personal particulars of that requester along with a history of requests made by the requester, and that this profile is useable for market research purposes.

The server arrangement 30 may compile the profile by submitting an electronic questionnaire along with the information to the return address which questionnaire is based on the history of requests and/or profile details of that particular requester. For example, a requester has previously requested information about cars, and in his next request a questionnaire is included asking questions relating to cars. It is to be appreciated that the request which includes the questionnaire about cars, need not necessarily relate to cars.

Accordingly, the e-mail server 34 may receive the completed questionnaire from the requester, and the server arrangement 30 then updates the profile of the requester with any relevant information contained in the completed questionnaire.

The system 39 for conducting research further includes a plurality of first systems or server arrangements 30, as described above, for different customers, along with a global server 40 arranged in electronic communication with the plurality of first systems 30 which global server 40 is configured to update a global requester profile database stored on the global server 40 with requester profiles from the server arrangements 30 so that a global database of profiles is created for market research purposes.

It is to be appreciated that reference numeral 30 in FIG. 2 refers to a first system and to the server arrangement, as these are in effect the same thing when referring to the global system 39.

The server arrangement 30 may verify whether or not the return address has been previously registered by checking if the return address is registered on that particular server arrangement 30.

Accordingly, the server arrangement 30 of the first system 30 may verify whether or not a return address of a requester 38 has previously been registered by checking if the return address is registered on the global server 40. It is to be appreciated that the return address of a requester is only required to be registered once on any one of the server arrangements 30. After first registration, the global server 40 updates the global requester profile database to include any new return addresses. Any server arrangement 30 is then able to access the global database to ascertain whether or not a return address has previously been registered.

It is to be appreciated that the server whereby the registration of a return address is verified and, if not registered, the subsequent registration thereof, may accordingly include the e-mail server 34 of the server arrangement 30, the information server 36 of the server arrangement 30, and/or the global server 40.

It is further to be appreciated that, when an e-mail server 34 of a server arrangement or first system receives a request, the server arrangement 30 will typically first check whether or not the return address is registered on that particular server arrangement 30, and if not, the server arrangement 30 will check the global server 40 to see if the return address is registered, before registering the return address.

The global server 40 may be a single conventional computer server. Otherwise, the global server 40 may include a plurality of conventional computer servers arranged in communication to form a single global server.

It is to be appreciated that by having a global server 40, a requester is only required to register once. Thereafter, a server arrangement 30 or first system 30 will automatically determine from the global server 40 that the return address is valid and any requests made by the particular requester will update his profile accordingly on the global server 40.

The global server 40 may update the global profile database by receiving an update from the server arrangement or first system 30 when information is e-mailed to a return address. Otherwise, the global server 40 may update the database by periodically accessing the server arrangement 30 and updating the profiles in the global database with any new requester particulars or history of requests stored by the server arrangement 30.

It is to be appreciated that a requester may be individually registered on the server arrangement 30 and that the global server 40 typically cross references these registration details between the server arrangements 30 or the first systems on the global database to enable the compiling of a more detailed profile on the global database than a profile stored individually on a single server arrangement 30. Similarly, a server arrangement or first system 30 may check the global database to ascertain if the server arrangement 30 has an up-to-date profile of a requester.

As described above, the system 39 incorporates a plurality of first systems or server arrangements 30, with the purpose of combining the results obtained by each separate system 30 for conducting market research on a global scale, as opposed to the system 30 being able to conduct research only on a "local" scale. Each server arrangement 30 typically represents an individual customer, e.g. audi.com, sony.com, or the like.

It is further to be appreciated that the global server 40 may classify the monitored requests according to certain groups of information, e.g. all requests relating to cars in general can be classified under a general group so that a customer is able to perform market analysis for these specific groups.

It is to be appreciated that the steps of the methods described above are generally performed by a software application running on the relevant server.

Accordingly, the present invention permits a website and specific page within a website to be assigned an e-mail address to permit the page to be accessed via an e-mail application. The e-mail address would define the page being accessed and would allow a consumer to send this e-mail from their e-mail application, the e-mail would be received by the website, and an application of the present invention installed on the website would access the web page assigned to the e-mail address, compile the page in a format capable of being viewed by an e-mail application and return the page to the consumer's inbox.

Previously, accessing a web page or website would require a user of the Internet to make use of Internet browser software e.g. "Microsoft Internet Explorer" to type in a specific URL address e.g. "www.audi.com" which would retrieve the web page from the web server hosting the website and load the web page into the web browsers viewing window. The present invention will permit the owners of websites like e-commerce websites, or websites owned by specific companies and brands to make use of the invention as an application installed onto their web server hosting their website pages to allow them to program and assign specific e-mail addresses to specific web page "URL addresses". These e-mail addresses could be assigned to specific categories of products within their website e.g. "hometheater@sony.com", individual product names e.g. "v200@samsung.com" or specific information within their website e.g. "newreleases@nokia.com" to allow the specific web page and "URL" to be retrieved by an e-mail application by a consumer sending an e-mail to the assigned e-mail address.

For instance, a consumer who would access the "www.audi.com" website to visit the specific web page and "URL" address providing detailed information on the Audi A3 vehicle rage e.g. "URL: www.audi.com/vehicles/3door/A3.html", would in the present invention simply send an e-mail to "A3@audi.com" and the application of the invention installed on the web server hosting the website would receive this e-mail, access the specific "URL" address and web page assigned to the e-mail, retrieve the page and compile the page in a format capable of being viewed in an e-mail message facility and return the page to the consumer's inbox.

The present invention is used for example, to allow a person or consumer to retrieve a website or web pages from their e-mail application using an e-mail address defining the location of the web page and how the website owners would configure an application installed on their website server to assign different e-mail addresses to web pages within their website to allow these pages to be retrieved by an e-mail application.

Figure 8:
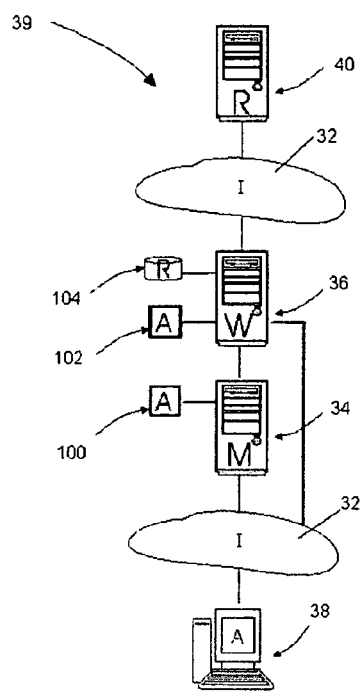
FIGS. 8, 9 and 10 shows further embodiments of the system shown in FIG. 2.
Figure 9:
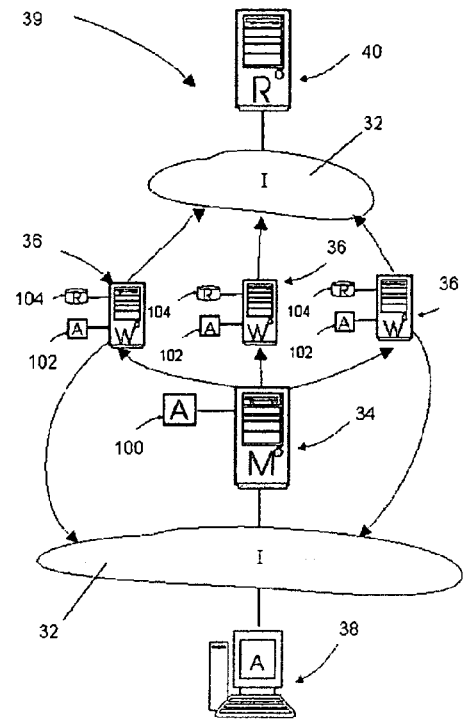
Figure 10:
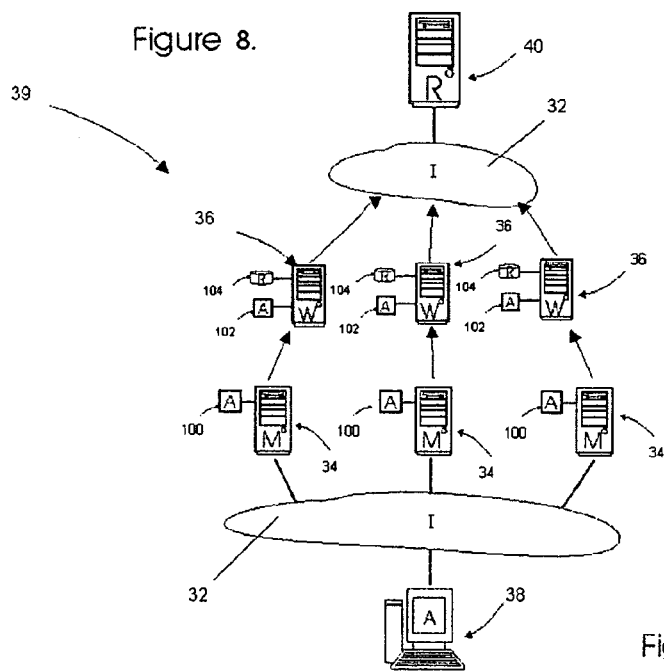

The following description of further embodiments refers to FIGS. 8, 9 and 10. It is to be appreciated that, in the following embodiments, the profiles of requesters are stored by the web servers, and that these embodiments should not be construed to limit the reasonable scope of the invention.

FIG. 8 represents a schematic representation of a further embodiment of the system 39, as described above, for the retrieval of a web page from an e-mail application according to the present invention.

The system 39 includes a requester access terminal 38 in the form of an Internet enabled workstation or computer associated with a requester 38 of website information. The e-mail server 34 hosting the e-mail domain for the relevant website with a mail application and software application 100 installed to monitor incoming e-mails requesting website information. The web server 36 hosts the website domain, web pages and URL addresses of the website associated with mail server 34. Web server 36 having an application and system installed 102 with the means of retrieving e-mail requests from mail server 34 and a means of extracting web pages from web server 36. Web server 36 having a registration repository 104 of authorized users of the system, such as a mass storage device associated with the registration of individuals accessing the website information from web server 36 by requester access terminal 38. The system 39 includes the global server 40 maintaining a mass storage device associated with the registrations of individuals accessing information from requester access terminal 38 of web server 36.

The requester access terminal 38, mail server 34 including mail application 100, web server 36 including application system 36 and registration repository 104 and global registration server 40 are all connected by an open communication system that is, in the embodiment, the Internet 32.

The requester access terminal 38 has an e-mail message facility thereon capable of receiving and sending e-mail messages. When an individual of requester access terminal 38 wishes to access a specific web page stored on web server 36 the individual would send an e-mail from his e-mail application, which would be received by mail server 34 hosting the specific e-mail domain of the website stored on web server 36. Making use of an e-mail address example "a3@audi.com", an individual of requester access terminal 38 would send an e-mail to access specific information about the Audi A3 Vehicle model, e.g. "a3@audi.com". The e-mail would be routed via the Internet 32 to the relevant e-mail server 34 hosting the e-mail domain of "audi.com". A specific e-mail application 100 on mail server 34 would monitor all incoming e-mails sent to the mail server 34 and respond only to the e-mail addresses registered on mail server 34 which are assigned to retrieve specific web pages from the web server 36 associated with mail server 34. When mail application 100 finds an e-mail sent to an e-mail address associated with accessing web page information according to the invention, e.g. "a3@audi.com". Mail application 100 would immediately forward the e-mail e.g. "a3@audi.com" to the web application 102 associated with web server 36 hosting the relevant web pages of the "Audi A3" from the "www.audi.com" website.

Application 102 would perform two important tasks. The application 102 would identify the "from" e-mail address associated with the e-mail address of requester of access terminal 38 e.g. "garthlong@yahoo.com" and the "send to" e-mail address e.g. "a3@audi.com" that the requester from access terminal 38 has sent the e-mail to. System 39 would require each individual associated with requester access terminal 38 to be an authorized user of the system 39 and will require the individual to be registered with the system 39 in order to retrieve web page information from the desired web server 36. Application 102 would then first access the repository of registered users 104 to identify whether or not requester access terminal 38 has registered to retrieve web page information from web server 36. Application 102 would identify within repository 104 a list of "from" addresses associated with registered users and identify from the list whether or not the "from" e-mail address e.g. "garthlong@yahoo.com" associated with requester access terminal 38 matches any of those found in the registration repository 104. The application and system 36 would also simultaneously access the global registration server 40 to identify if the "from" e-mail address associated with requester access terminal 38 appears within registration server 40 repository. If application 102 does not find the "from" e-mail address e.g. "garthlong@yahoo.com" associated with the requester of access terminal 38 registered on either registration repository 104 of web server 36 and global registration repository 40 respectively. Application server 102 would compile a registration page and immediately forward the registration page to the requester of access terminal 38. The registration page would arrive in the "inbox" as an e-mail in the requester's e-mail message facility of access terminal 38. The requester would then have the opportunity of registering his e-mail account. The registration page would either be available in the message window of the e-mail sent to the requester of access terminal 38 e-mail application, or would provide a link within the e-mail to view the registration page in a web browser for completion.

Registration process of the invention will enable the requester 38 of information to register his e-mail account to be authorized to access web page information from websites connected to the system 39. This registration will provide the website relevant information on the profiles of individuals accessing specific web page information from their web site. Registration information would include, but not be restricted to, information pertaining to the return e-mail address of the requester, the name of the requester, age, gender, population group, geographic location concerning the country, town and city that the requester originates from. These registration details will provide the relevant information to the websites who allow web pages to be retrieved by an e-mail sent from a requesters e-mail application according to the present invention to understand the profiles of the individuals accessing their website information. Currently, when an individual accesses web page information from a website directly from a web browser, the web browser has no means of identifying the individuals viewing these pages. E-mail applications however, can identify individual e-mail requesters according to their unique e-mail addresses. It is envisaged that the present invention would greatly enhance the ability of website owners to identify and understand the exact profiles of their website visitors by providing access according to the invention from a consumer e-mail application and by providing a registration process unique to each consumers e-mail account.

Once the requester from access terminal 38 has completed the registration form and submitted the form through the open communication channel of the Internet 32, the registration form would be received by application 102 who originally sent the registration to requester of access terminal 38. Application 102 would then simultaneously register the requester of access terminal 38 registration detail in registration repository 104 located on web server 36 and the global registration server 40. Once the registration process has been completed, Application 102 would access the relevant pages associated with the "send to" e-mail address e.g. "a3@audi.com" associated with the original e-mail sent by the requester of access terminal 38 to retrieve web pages from the relevant website e.g. "ww.audi.com" stored on web server 36, locate the pages and specific URL addresses associated with e-mail address e.g. "www.audi.com/newvehicles/a3.html" as explained in FIG. 1, and compile these page into a format capable of being transmitted and viewed by and e-mail message facility and send this information in an e-mail to the "from" e-mail address e.g. "garthlong@yahoo.com " associated with the requester access terminal 38.

Numerous modifications are possible to this embodiment without departing from the scope of the invention. FIG. 9 and FIG. 10 provide further possible modifications to the system without departing from the scope of the invention.

In FIG. 9, system 39 may be modified according to the following embodiment. Mail server 34 may host more than one e-mail domain, e.g. "@audi.com, @sony.com, @uspto.gov". E-mails sent to mail server 34 from requester access terminal 38, would be retrieved and collected by mail application 100 and distributed and forwarded to the relevant web servers 36 hosting the relevant web page information. These web servers 36 would make use of their own applications 102 to deal with registration as mentioned in the above embodiment as well as collect web page information from their own web servers 36 and return this information according to the method of the present invention to requester access terminal 38.

Similarly, in FIG. 10, there may be provided access according to the present invention for a multitude of requester's associated with access terminal 38 to send e-mails to retrieve web pages from different websites that may be received by multiple mail servers 34 that may be responsible for the hosting of these e-mail domains. These mail servers 34 would, in turn, deal with the processes of the invention as discussed in the proffered embodiment detailed above in FIG. 8.

Referring to FIG. 9, the following process details the preferred embodiment of the registration process of requester access terminal 38. The registration process is meant to provide a simple method of updating multiple web servers 36 connected to the system 39 of the present invention with the registration detail of requesters accessing information across different websites in order to provide requester of access terminal 38 the benefit of a once off registration process that can be verified by different web servers 34 connected to the system 39.

Currently, when accessing an Internet website from a web browser, visitors who want to access specific information requiring a registration process would be required to register with that website to access the information. Once registered the information would become available. This process is duplicated for each website the visitor accesses through their web browser, meaning that each website provides its own registration process independent of all other websites. Web browsers as mentioned above, can't distinguish between visitors accessing information. E-mail applications however, provide a unique e-mail account for each individual, which in turn would identify the individual accessing web page content from their e-mail applications as provided within the embodiment of this invention. The registration process of the invention would allow individuals who access and retrieve website information from their e-mail applications, the convenience of completing only one registration process. Once registered, their registration would be available to all websites connected to the system by the processes involved with these websites as detailed within the embodiment of the invention to access a global registration server that can verify the registration details of all requesters who have previously used the system.

FIG. 9 can be used to describe in detail the registration process of the invention. Each web server 36 maintains a repository 104 of their own registered users of requester access terminal 38 who have retrieved web pages from their e-mail applications specific to the individual web servers 36. Registered users across all web servers 36 will simultaneously register their visitors with a global registration server 40 containing a large repository of all registered users associated with requester access terminal 38. Global registration server 40 will connect all web servers 36 using the system by an open communication channel that is the Internet 32.

Registration details will identify the requester from his "from" e-mail address e.g. "garthlong@hayoo.com" associated with requesters of access terminal 38 that sends an e-mail to any of the web servers 36 to retrieve web page information, and identify whether or not the requester 38 has registered his e-mail account and completed the registration form. If requester from access terminal 38 has accessed a web page and has already registered with web server 36 his registration details will be stored in registration repository 104 and application system 102 would also simultaneously register the individual with global registration server 40. If requester access terminal 38 accesses web pages from his e-mail application from web server 36 for the first time, application system 102 would first check whether or not the "from" e-mail address e.g. "garthlong@yahoo.com" of the requester access terminal 38 is registered in registration repository 104 of web server 36, and if nothing is found the application system 102 would then access the global registration repository 40 to find out whether or not the requester of access terminal 38 had previously accessed the system through any other web server 36 connected to the system and was registered in the global registration repository 40. Because requester access terminal 38 had previously accessed a web page connected to the system from his e-mail application, and completed the registration process, his registration details would appear in the global registration repository 40 along with his "from" e-mail address e.g. "garthlong@yahoo.com" identifying the his registration and his return address. Registration repository 40 would confirm the registration and simultaneously register the details of the requester with registration repository 104 of web server 36. Having identified, the requester of access terminal 38, the application system 102 of web server 36 would immediately retrieve the desired web pages associated with the "sent to" e-mail address stored in the web server 36 to the "from" e-mail address of the requester of access terminal 38 and return the pages in an e-mail to the requester without requiring any new registration.

Numerous modifications are possible to this embodiment without departing from the scope of the invention. For example, the e-mail sent to the mail server 34 may include a subject and message which would not depart from the scope of the invention, also subject field may include an instruction to allow the e-mail sent to the website where web pages are being retrieved to either forward the desired web page to a different e-mail address or instruct the website to return the information in a particular format. For instance, the "from" e-mail address may be e.g. "garthlong@yahoo.com", but in the subject of the e-mail sent to the web server an e-mail address (SUBJECT: john@hotmail.com) may instruct the desired web page to be return to the "from" e-mail address and also forward to the e-mail address stated in the subject field. The subject may also include more than one e-mail address, (SUBJECT: john@hotmail.com, edward@yahoo.com, candy@mailbox.com), which would instruct the web server to forward the desired web page to more than one requester. Similarly, the subject filed in the sent e-mail may instruct the web server receiving the e-mail to return the desired web page in a particular format. For instance (SUBJECT: txt, or SUBJECT: html, or SUBJECT: Attachment) would instruct the web page to either be return to the requester inbox as a "TXT" page with no graphics or a "HTML" page similar to what would be found on the web page viewed in a web browser or as an attachment or document in the returned e-mail from the website.

Numerous modifications are possible to this embodiment without departing from the scope of the invention. For example, the content of the desired web page extracted from the website may be modified by the system 39 in order to be viewed by an e-mail message viewing window. The returned e-mail may include a link to view the specific web page in a web browser or send the entire web page and all related web pages directly to the e-mail message viewing window, allowing the requester to click on buttons and links within the e-mail and have the new content uploaded into the e-mail message window without having to open a new page or view the content in a web browser. In addition, web page content may be constructed in any viewable format capable of being viewed by a web browser or e-mail message facility. Web page content returned by the present invention in an e-mail to the requester could include but not be restricted to, TEXT based content, HTML, or vector based graphics like the popular macromedia flash, java applets and language or any web based language capable of viewed by a web browser software or e-mail software.

A specific embodiment and application of the invention is now described below.

Figure 11:
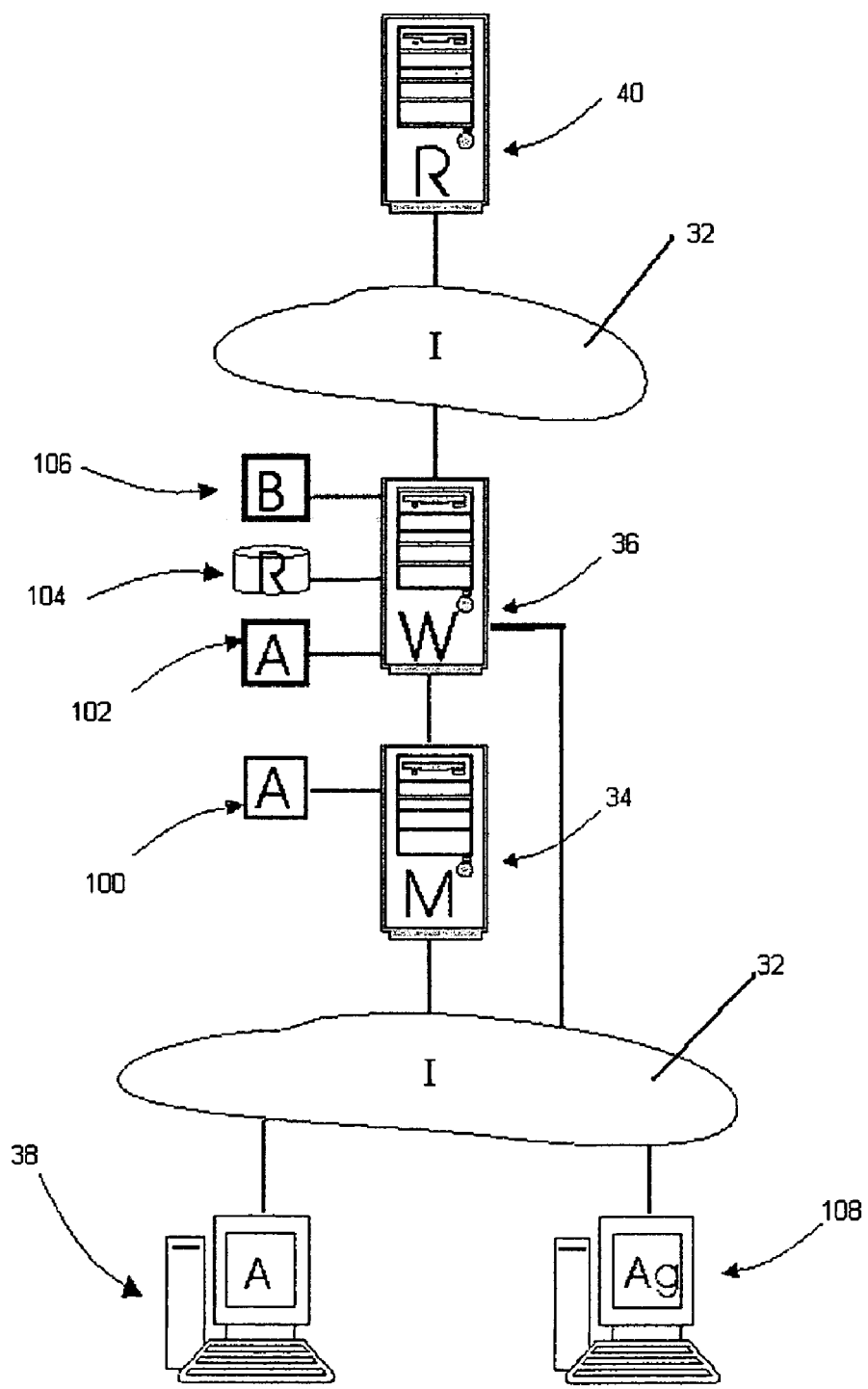
FIG. 11 shows a specific embodiment of the system shown in FIG. 2 when applied as an airline booking system.

FIG. 11 describes a specific application and use of the system as an airline destination travel and booking system. The workings of FIG. 11 represents the same processes for retrieving web pages, registering and receiving a specific web page content from an e-mail application as described in detail in FIG. 2 above. It is the intentions of this embodiment to provide a specific use of the system 39 to be included into the embodiment of the invention. Where as in the previously mentioned embodiment of the invention, a requester of access terminal 38 would be able to access a web page stored on web server 36 by sending an e-mail describing the page being accessed in the e-mail address as described in FIG. 4, and then having the web server 36 receive the request for this desired web page, process and verify the requester access terminal 38 registration through the web server's 36 registration repository 104 and the global registration server 40, before returning the desired web page to the requester access terminal 38. It is the intentions of the modifications in the process of FIG. 11, to provide a convenient method of accessing specific airline and travel bookings information that can be accessed by the sending of and e-mail to the desired web server hosting the application and system of the invention to retrieve this information.

Currently, online airline bookings require a consumer to visit the airlines website to make travel arrangements. Online airline booking systems make use of sophisticated software systems and repositories to manage airline seat availability, flight schedules etc. It is the intentions of this new embodiment of the invention to provide a simple and convenient method of accessing specific departure and destination travel information by making use of an e-mail application to access this information without having to visit the airlines website from a web browser.

To access flight and travel information from an airline, requester access terminal 38 would use his e-mail application and the e-mail request as described in FIG. 4 above to send an e-mail to the desired airline of choice represented by web server 36 in FIG. 11. In the "send to" e-mail address as described in FIG. 4 above, the requester of access terminal 38 of the modified system of FIG. 11 would type in the departure city and destination city of his intended flight booking request, e.g. "londonnewyork@ba.com". The departure city "London" at the start of the e-mail address followed by the destination city "newyork" before the "@" sign of the e-mail address. "ba.com" after the @ sign would represent the requester of access terminal 38 intentions of booking a trip with a specific airline of choice, e.g. "British Airlines"

Included in the e-mail request as illustrated and explained in FIG. 4, the requester of access terminal 38 of the modified system of FIG. 11 would include a departure date followed by a return date in the "Subject filed" of the e-mail request as described in FIG. 4. e.g. "SUBJECT: 13 June-29 June". Connected to the modified system of FIG. 11 is an airline booking system 106, this booking system 106 would hold all the information of flight schedules, booking information etc needed for any one accessing the airlines online booking system from a web browser to make a flight booking. Application system 102 of FIG. 11 would have a means of accessing Booking system 106 of FIG. 11 and according to the original e-mail as described in FIG. 4, requested in the "send to" e-mail address e.g. "londonnewyork@ba.com" and the departure and return dates in the "Subject field" of the e-mail request e.g. "13 June-29 June". The application system 102 of FIG. 11 would collect from booking system 106 the relevant flight booking information and costs and return the information to Requester Access Terminal 38 from FIG. 11 all the information required to make a flight booking.

Still further features of the invention as indicated by the modified system of FIG. 11 would include an Agent Access Terminal 108, associated with any Internet enabled workstation capable of accessing the Internet. Web server 36 would provide access to a web based application accessible through the airlines website. This web based application would be designed to provide car rental companies, hotels, guesthouses etc, the ability to access a web based system provided by the web server 36. These organizations would be provided a login password to access a system to allow them to register their particular offering. They would register themselves in either car hire or accommodation and then be able to provide their detailed information, price list, services etc. These registered agents will then be added to the destination travel of the airline booking system 106 of modified FIG. 11. When web server 36 returns flight booking information to the requester access terminal 38 the booking system 106 would also include in the web page returned to the requesters e-mail information pertaining to car hire and accommodation specific to the requesters destination travel e.g. "newyork" as mentioned above in the e-mail request.

Numerous modifications are possible to this embodiment without departing from the scope of the invention.

It will be appreciated that the system 39 may be applied, in a further preferred embodiment, to provide in addition to the various modification as discussed above, a market research application for website owners connected to the system and companies with specific market research needs to enable them to make use of the system to disseminate research questionnaires to the consumers accessing specific web page content from their e-mail applications. This application is described hereunder:

Market research conducted on the web has been a popular method of ascertaining the perceptions of consumers about companies and their brands and products and service that they offer. Understanding consumer buying criteria and the decision making process that leads to a sale is critical to all companies to best understand their markets and to assist these companies in developing marketing and sales strategies to target these consumers. Currently marker research conducted on the web relies on research surveys that are included on various websites targeting the profiles of the website visited to specific research interest groups. These surveys are either included in the web page or are initiated within a pop-up window containing the research survey. These profiles are specific to the websites visited, as there is no way of identifying each web visitor, e.g., age, population group, name, country of origin etc who access the website from their web browser as mentioned earlier. This process becomes problematic for researches as certain research questionnaires targeting a specific profile of consumers visiting a website, may be targeted towards a completely incorrect consumer. For instance a research questionnaire may target a specific market research group associated with the purchase decision making process and spending patterns of credit card consumers in the US, various websites may be targeted to display these research questionnaires, but because the web browsers of consumers accessing these websites have no way of knowing who these web visitors are, the questionnaire may be displayed to a consumer resident in the UK, who would obviously not be relevant for the questions being asked.

Also, research companies have developed over the years a vast e-mail database of consumer that is frequently used to take part in e-mail research on behalf of their clients. These forms of research however are unable to target consumers with specific research questionnaires at the exact time of being interested in a certain product or service. For instance, if a research knew the demographic profile of a consumer e.g. "age, income, bracket, location" who had accessed a web page specific to a brand of mobile phone, a system could be initialised to collect research questionnaires specific to that consumer interest and/or profile, or even a research survey specific to a client in the mobile phone market at the exact time that the consumer accessed the page and disseminate a research questionnaire to that consumer. It is sometimes difficult to get accurate information about a purchase decision or about a specific category of product if the consumer targeted has no interest in the product category or has no interest at that time to understand why he would buy a product that he would not be purchasing soon anyway.

It is envisaged, in the current invention that such a research tool could be effectively utilised due to the nature of the invention providing detailed profiling of each consumer accessing specific product and web page information from his or her e-mail applications. The opportunity exist within the current invention to target research questionnaires or individual questions to consumers making use of the current invention by making use of the registration process and the specific web pages being accesses as a reference point to disseminate research questions to these individuals directly in the e-mail communication that they receive from the website that they are accessing. It is envisaged that such a research application could dramatically increase the targetability of research questionnaires as well as the ability for researchers to disseminate research questionnaires more accurately to the relevant target groups of consumers that best fit the profiles of their research questionnaires making use of the Internet.

A detailed embodiment of the inclusion of a research system to the invention is now described below.

For example, the requester access terminal 38 will make use of his e-mail message facility and the same "e-mail request" as described in FIG. 4 to access web page content from the desired web server 36. The registration verification process determining whether or not requester access terminal 38 is a registered user of the system and processes of verifying registrations and registering users, making use of registration repository 104 and global registration server 40 is used without any modification as represented in the embodiment of the present invention.

The methods of disseminating research questionnaires of the present invention are now discussed. Global research server and repository 40 stores registration details or profiles for all web servers 36 connected to the system 39 through the open communication system that is the Internet 32, is connected to a research application server (not shown) included in the global server 40, that has the specific application installed to create research questions and disseminate these questions to the appropriate e-mail requester according to their registration details. Research application server (not shown), having a means of creating a research questionnaire capable of being sent to an e-mail message facility will assign specific research questionnaires to be distributed to the profiles of registered users of global registration repository 40. For instance, global research server and repository 40 provides registration details for registered users retrieving web pages from web servers 36 connected to the system according to age, income brackets, population groups and geographic location specific to countries and regions. Research application (not shown) will have a means of assigning a specific research questionnaire or specific research questions to be only distributed to requesters that fit a certain profile, e.g. "Age: 18-24, Population group: White & Hispanic, Country: USA". Registration repository 40 is connected to all web servers 36 connected to the system and is involved with the registration and verification of every web page requested from requester access terminal 38. When a requester of access terminal 38 sends an e-mail to retrieve a web page from web server 36 and the registration details match those of a research questionnaire available in research server and application (not shown). Research server and application (not shown) will send the research questionnaire through the open communication system of the Internet 32 to application system 102 associated with server 36 and instruct application system 102 to include the research questionnaire in the e-mail returned to the assigned requester of access terminal 38. Application system 102 will retrieve the web pages associated with the e-mail request from the requester of access terminal 38 from web server 36 and will compile these pages in a format capable of being retrieved by the e-mail message facility of requester access terminal 38. Before returning the e-mail to the requester as provided in the modification of the system making provision for a research system, application system 102 will insert the research questionnaire assigned to the requester from research server and application (not shown) and will return the e-mail including the research questionnaire to the requester of access terminal 38.

Once a research questionnaire has been completed by requester of access terminal 38, the answers will be returned through the open communication channel of the Internet to research server and application (not shown). Completed answers for individual requester form requester access terminal 38 will be stored in mass storage device, and the application of research server and application (not shown) will have a statistical analysis system included thereon to provide detailed research statistics on the complete questioners.

While research server and application (not shown) is able to disseminate research questionnaires to all web servers connected to the system. The system also makes provision for each web server 36 connected to the system of the invention to have the research application (not shown) installed on the global server 40 to allow web server 36 and application system 102 to disseminate their own research questionnaires to their own consumers requesting information from their unique web pages stored on web server 36. This will provide a respective website connected to the system e.g. "www.audi.com" the ability to target research questions to their own consumers who have an interest in their products. Research application (not shown) will make use of registration repository 104 to assign research questions to the appropriate profiles of consumers requesting web page information as discussed above, and application system 102 will insert the research questionnaire in the e-mail returned to the appropriate requester of access terminal 38 who retrieves web pages from web server 36 from their e-mail message facility.

Once a research questionnaire has been completed by requester of access terminal 38, the answers will be returned through the open communication channel of the Internet 32 to research application (not shown). Completed answers for individual requester form requester access terminal 38 will be stored in mass storage device, and the application of research application (not shown) of web server 36 will have a statistical analysis system included thereon to provide detailed research statistics on the complete questioners.

It shall be understood that the examples are provided for illustrating the invention further and to assist a person skilled in the art with understanding the invention and is not meant to be construed as unduly limiting the reasonable scope of the invention.

The Inventor regards it as an advantage that the invention facilitates the quick and efficient provision of website information to a requester without the requester having to search on a network. A further advantage of the invention is the ability to send unsolicited e-mails to a requester to inform the requester about products without resorting to spam e-mails, as the requester has authorised the e-mail. The Invention further provides for an improvement to existing online market research methodologies by being able to identify a requester along with the information that he requests so that a market profile may be compiled for that requester. Furthermore, the Invention enables the monitoring of subsequent requests made by a requester so that the profile for that requester can be kept up to date. A further advantage is that promotional information may be sent to the requester according to the interests of the requester as indicated by his profile.

The invention claimed is:

1. A method of automatically relaying website content by e-mail across an electronic network, which method includes the following steps, in any order:
   receiving an e-mail request from a requester wherein the e-mail is addressed to a specific electronic mailbox address assigned to and associated with specific website content, and the e-mail includes an electronic return address to which the website content is to be relayed to;
   retrieving the website content from a web server wherein the content is assigned to the specific mailbox address to which the received e-mail was addressed;
   converting the retrieved website content into a specific format specified by the e-mail request; and
   electronically mailing the converted website content to the return address, so that the requester receives the website content without having to search the network.

2. A method as claimed in claim 1, which includes the step of, prior to receiving the request, the step of assigning a specific electronic mailbox address to specific website content, wherein the mailbox address specifies a domain that identifies a website and at least a category or name that identifies the specific website content provided by the website.

3. A method as claimed in claim 1, wherein the website content is identified by a Uniform Resource Locator (URL).

4. A method as claimed in claim 3, wherein the step of assigning the mailbox address includes assigning one mailbox address to a plurality of URL's.

5. A method as claimed in claim 1, wherein the step of receiving the e-mail request is performed by an e-mail server hosting the specific mailbox address assigned to the website content requested by the requester.

6. A method as claimed in claim 1, wherein the e-mail server and the web server are included in a single combined server.

7. A system for automatically relaying website content across an electronic network which system includes:
   at least one web server which hosts specific website content; and
   at least one e-mail server for receiving an e-mail request from a requester, which e-mail server is arranged in electronic communication with the web server, wherein the e-mail server hosts an e-mail address to which the received e-mail request is addressed which address is assigned to and associated with the specific website content and which e-mail request further includes an electronic return address to which the website content is to be relayed to, and wherein the e-mail server is configured to retrieve the website content from the web server based on the domain and at least a category or name included with the domain in the e-mail address and to convert the retrieved website content into a specific format specified by the e-mail request, and which e-mail server electronically mails the converted website content to the return address, so that the requester receives the website content without having to search the network.

8. A system as claimed in claim 7, wherein the e-mail server facilitates retrieval of the website content from the web server by assigning a specific electronic mailbox address to specific website content hosted by the web server, wherein the mailbox address specifies the domain to identify the at least one web server and the category name identifies the specific website content povided by the at least one web server.

9. A system as claimed in claim 7, wherein the website content is identified by a Uniform Resource Locator (URL).

10. A system as claimed in claim 9, wherein the e-mail server assigns one mailbox address to a plurality of URL's.

11. A system as claimed in claim 7, wherein the e-mail server retrieves the website content from the web server by the web server, in response to a communication from the e-mail server, transmitting the content to the e-mail server.

12. A system as claimed in claim 7, wherein the e-mail server attaches the convened website content to the e-mail sent to the return address.

13. A system as claimed in claim 7, wherein the e-mail server and the web server are included in a single combined server.

14. The method of claim 1, wherein the specific format to which the retrieved website content is converted to comprises a format viewable as an e-mail.

15. The method of claim 1, wherein the specific format to which the retrieved website content is converted to comprises a document format viewable without having to access the Internet.

16. The system of claim 7, wherein the specific format to which the retrieved website content is convened to comprises a format viewable as an e-mail.

17. The system of claim 7, wherein the specific format to which the retrieved website content is converted to comprises a document format viewable without having to access the Internet.

18. A method as claimed in claim 15, wherein the step of mailing the website content to the return address includes attaching the converted website content as an attachment to the e-mail sent to the return address.

* * * * *